Patented Jan. 30, 1934

1,944,881

UNITED STATES PATENT OFFICE 1,944,881

PREPARED CAKE FLOUR

Jacob Finkel, Philadelphia, Pa.

No Drawing. Application March 20, 1930
Serial No. 437,613

2 Claims. (Cl. 99—11)

The present invention relates to improvements in food compositions for making cake flour.

The object of the present invention is to produce a prepared cake flour in the form of a bone-dry powder which when water is added thereto will produce a baking dough whereby cake, bread, biscuits, crullers and the like may be baked.

A further object is to provide a prepared cake flour that will simplify the art of baking and enable any inexperienced person to satisfactorily bake a cake or the like by simply reading and carrying out the instructions printed on the cartons within which the prepared flour is packed.

Another object is to provide a prepared cake flour wherein the baked articles will possess the essential vitamins and be readily and easily digestible as well as nutritious.

In preparing my composition, I take the following ingredients, the parts being by weight:

| Ingredient | Amount |
|---|---|
| Soft winter wheat flour | 63 lbs. |
| Spring wheat flour | 6 lbs. |
| Tapioca | 4 lbs. |
| Sugar | 58 lbs. |
| Milk | 9½ lbs. |
| Cocoanut oil | 9½ lbs. |
| Egg | 1¾ lbs. |
| Cocoa | 9½ lbs. |
| Salt | 6 oz. |
| Cinnamon | 4 oz. |
| Vanilla flavor | 3 oz. |
| Pyrophosfate (ground 50% strength) | 4 lbs. |
| Bicarbonate of soda | 2 lbs. |

The above named ingredients are compounded as follows: The flour and tapioca are placed in a vacuum drier in which a rotary agitator operates to thoroughly stir the contents and the vapors of the flour are driven off by a vacuum pump.

The sugar, milk, cocoanut oil, egg, cocoa, salt, cinnamon, and vanilla flavor are then added to the dried flour and are thoroughly agitated whereby to cause a blending action to take place in the drier, due to the vaporization of the ingredients and a unified mass will be produced, the blending action taking place under low temperature. (140° Fahrenheit).

The most essential feature of this preparation is the introduction and use of cocoanut oil as the shortening. By combining the cocoanut oil with the cocoa, I am able to procure a chocolate flavor which is so desirous in a chocolate cake. After a number of years of experimentation with various oils, I have found that the cocoanut oil is the only oil that will bring out the chocolate flavor of the cocoa. To date, commercial bakers are dependent on what is known as "Deviled food cake" in view of the fact that they cannot make a commercial chocolate cake. Spices are often employed to offset the chocolate flavor which could not be incorporated unless bitter chocolate is used. The use of bitter chocolate commercially is a tedious task and is, therefore, unpopular and for which reason, the baker is compelled to substitute spices in his chocolate cake. However, my preparation produces the maximum desired results of the finished chocolate cake and the preparation of the formula is dependent upon the method set forth in my copending application, Serial No. 437,612 wherein the blending action takes place at a temperature of 140 degrees thereby assuring the desired chocolate flavor, a uniform texture and causing the finished product to possess the most desirable palatable and digestible qualities.

The contents are then removed from the drier and are cooled in any suitable manner after which the leavening agents, namely pyrophosfate and bicarbonate of soda are added and immediately thereafter, the mixture is put up in moisture proof and air-tight containers.

The egg and milk ingredients named above may be either in the dry or liquid form and furthermore, the flavoring may be added at the same time the leavening agents are added, rather than at the time the flour is mixed with the other ingredients.

It is also to be understood that I do not wish to limit myself to the particular proportions of the various ingredients as stated.

A preparation of the above mentioned character will produce a prepared flour which when water is added thereto will produce a baking dough and the article baked will be healthful as well as readily and easily digestible.

I claim:

1. The method of preparing a food mixture in the form of a bone-dry powder for making cake dough comprising agitating and heating a mass of grain flour under a vacuum for removing the moisture from the flour, then adding cocoanut oil, cocoa and other perishable ingredients to the dried flour and continuing the heating and agitation of the mass at a temperature substantially below 185 degrees Fahrenheit for a time sufficient to drive off substantially all free moisture whereby to produce softening of the flour glutens and blending of the cocoanut oil therewith.

2. The method of preparing a food mixture in the form of a bone-dry powder for making chocolate cake dough comprising agitating and heating a mass of grain flour under a vacuum for removing the moisture from the flour, then adding cocoanut oil, cocoa and other perishable ingredients to the dried flour and continuing the heating and agitation of the mass at a temperature approximately 140 degrees Fahrenheit for a time sufficient to drive off all free moisture, whereby to produce blending of the cocoanut oil with the cocoa, then cooling the mass and subsequently adding a leavening agent to the cooled mixture.

JACOB FINKEL.